Dec. 18, 1928.
O. W. BANE
1,695,944
CARPENTER'S COMBINATION TOOL
Filed Jan. 18, 1928
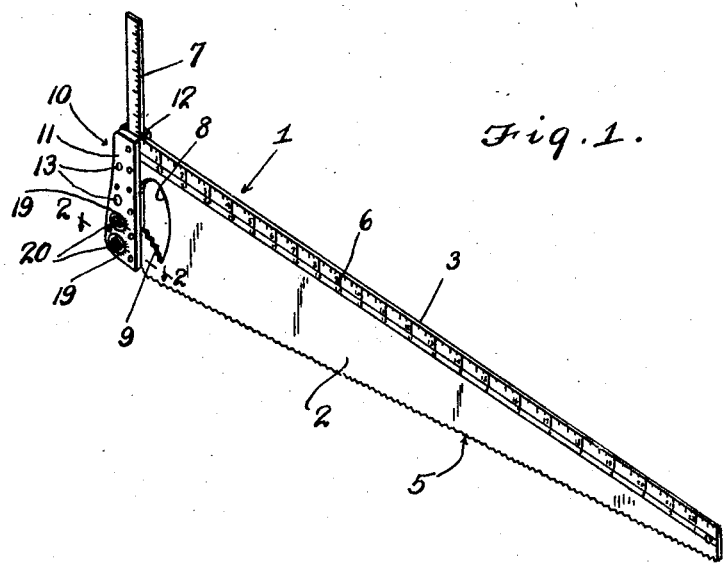
Fig. 1.
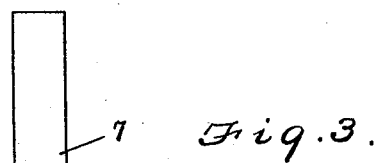
Fig. 3.
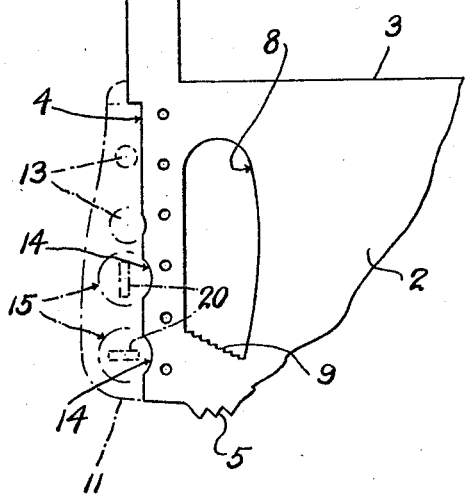
Fig. 2.
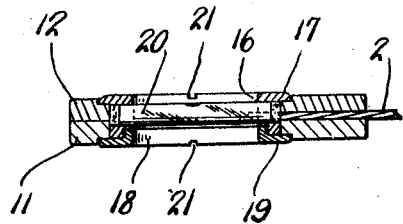
Inventor
Oscar W. Bane
By Clarence A. O'Brien
Attorney Patented Dec. 18, 1928.

1,695,944

UNITED STATES PATENT OFFICE.

OSCAR W. BANE, OF CUMBERLAND, MARYLAND.

CARPENTER'S COMBINATION TOOL.

Application filed January 18, 1928. Serial No. 247,625.

The present invention relates to improvements in compound tools, and has reference more particularly to a carpenter's combination tool which embodies a plurality of implements that heretofore have generally been manufactured as separate articles.

One of the important objects of the present invention is to provide a carpenter's combination tool which will serve all the necessary purposes incident to the cutting and measuring of lumber.

A further object is to provide a carpenter's combination tool of the above-mentioned character which is simple in construction, inexpensive, strong and durable, and further well adapted to the purpose for which it is designed.

Other objects and advantages of the invention will become apparent from the following description.

In the accompanying drawing wherein like reference characters indicate corresponding parts throughout the several views:

Fig. 1 is a perspective view of the carpenter's combination tool embodying my invention;

Fig. 2 is an enlarged sectional view taken substantially on the line 2—2 of Fig. 1 for more clearly disclosing the level forming unit and the manner in which the same is mounted in the handle for the saw blade; and Fig. 3 is a fragmentary elevational view of the larger end of the saw blade showing the right-angular extension and the arcuate notches formed in the vertical edge of the blade.

In the drawing wherein for the purpose of illustration is shown the preferred embodiment of my invention, the numeral 1 designates generally my improved carpenter's combination tool, the same comprising a saw blade 2 that is formed with a horizontally disposed straight edge 3, the larger end of the blade having its edge disposed perpendicular with respect to the horizontal straight edge 3 as is clearly shown in Fig. 3 of the drawing. The other longitudinal edge of the blade is formed with the saw teeth 5. Graduations 6 are arranged on the saw blade 2 along the straight edge 3 whereby the tool may be used as a rule.

An extension 7 is formed integrally at the larger end of the saw blade and the same extends laterally from the straight edge 3 for cooperation therewith to provide a square. This extension may also be provided with graduations, as clearly shown in Fig. 1.

The larger end portion of the saw blade is formed with an enlarged opening 8 to permit the hand of the user to extend therethrough, and the lower portion of this enlarged opening 8 is formed with the stepped shoulders 9 that are disposed at substantially right angles with respect to the straight edge 4.

The handle for the saw blade is designated generally by the numeral 10 and the same includes the complementary plate sections 11 and 12 which are disposed on opposite sides of the larger end portion of the blade 2 and are secured rigidly to the blade by rivets or the like. The inner vertical edges of the plate-like sections 11 and 12 of the handle 10 lie in the same vertical plane with the inner edge of the extension 7 and the inner vertical edges of the sections of the handle are also disposed at right angles with respect to the horizontal straight edge 3 of the saw blade 2. The outer vertical edge portion of the handle-forming sections may be shaped so as to permit the handle to be properly grasped when the tool is to be used. For the purpose of rendering the handle, which is constructed of any suitable metal, light in weight, suitable openings 13 are formed therein through both of the sections.

The handle is furthermore provided with enlarged circular openings to accommodate a pair of level-forming units, and to this end the sections comprising the handle are formed with registering circular openings, the outer faces of the sections around the openings being countersunk to form suitable shoulders for a purpose to be presently described. The vertical straight edge 4 of the saw blade 2 is formed with the arcuate notches 14 that cooperate with the respective circular openings 15 formed in the handle 10 to form a part of the circumference of the respective circular openings, as is clearly illustrated in Fig. 3.

The level-forming units that are associated with the handle 10 each comprise a sleeve 16 that is formed at its outer edge with an annular flange 17, the inner edge portion of the sleeve being formed with internal threads for cooperation with an externally threaded ring 18 which is formed at its outer edge with an annular flange 19. A liquid column holding glass tube 20 extends diametrically across the sleeve 16 and is secured at its ends in suitable sockets provided therefor in said sleeve, it being understood of course that the ends of the glass tube are sealed after the liquid has been poured therein. The flange 17 will fit against the shoulder formed in the outer face of the plate-like section 12, while the flange 19 of the locking ring will fit against the annular shoulder formed in the outer face of the complementary plate-like section 11 so that the level-forming unit cannot be accidentally displaced from its respective circular opening 15 in the handle.

For the purpose of facilitating the disassembly of the parts of each of the level-forming units, each of the flanges is formed with notches such as are shown at 21 for the reception of a suitable spanner wrench key, not shown, whereby said flanges may be readily turned to enable the threaded ring 18 to be separated from the internally threaded sleeve 16 whereupon said element may be readily removed from the handle.

The level-forming units are arranged in the respective openings in the handle in such a manner as to cause one of the liquid columns to cooperate with the horizontal straight edge 3 of the saw blade 2, while the liquid column of the other unit will be adapted for cooperation with the vertical straight edge 4 in the manner well known in the art.

Furthermore, by reason of the arcuate shaped notches 14 forming a continuation or part of the circumference of each of the circular openings 15, the level forming units disposed in said openings will also enter the respective notches 14 to assist in rigidly securing the saw blade in proper position with respect to the handle 10 and the right-angular extension 7 with respect to the inner vertical edges of said handle.

While I have shown the preferred embodiment of my invention, it is to be understood that minor changes in the size, shape, and arrangement of parts may be resorted to without departing from the spirit and scope of the appended claims.

Having thus described the invention, what I claim as new and desire to secure by Letters Patent:—

1. In a carpenter's combination tool, a saw blade having an upper horizontal straight edge, one end of the blade being disposed at right angles to said straight edge, an extension formed on said end of the blade and extending upwardly from the horizontal straight edge at right angles thereto, said end of the blade being formed with a hand hole, a handle employing a pair of complementary plate sections secured on the opposite sides of the said ends of the blades, the inner vertical edges of said plates being disposed in the same vertical plane with the inner edge of the extension, said vertical inner edges of the plate lying flush with the adjacent side edge of the hand hole, the outer edges of the plate being shaped to provide a hand grip.

2. In a carpenter's combination tool, a saw blade having an upper horizontal straight edge, one end of the blade being disposed at right angles to said straight edge, an extension formed on said end of the blade and extending upwardly from the horizontal straight edge at right angles thereto, said end of the blade being formed with a hand hole, a handle employing a pair of complementary plate sections secured on the opposite sides of said ends of the blades, the inner vertical edges of said plates being disposed in the same vertical plane with the inner edge of the extension, said vertical inner edges of the plate lying flush with the adjacent side edge of the hand hole, the outer edges of the plate being shaped to provide a hand grip, said plates being provided with communicating circular openings, said end of the blade having an arcuate notch formed in the edge thereof and forming a part of the circumference of the aforementioned circular openings, a level-carrying unit supported in the registering openings, said unit including a sleeve flanged at its outer edge, the inner edge portion of the sleeve being threaded, a liquid column mounted in said sleeve, a threaded ring for cooperation with the threaded portion of the sleeve, and a flange on the outer edge of said ring, the outer faces of the plate being countersunk around the respective openings to receive said respective flanges.

In testimony whereof I affix my signature.

OSCAR W. BANE.